(12) United States Patent
Katz et al.

(10) Patent No.: US 11,526,791 B2
(45) Date of Patent: Dec. 13, 2022

(54) METHODS AND SYSTEMS FOR DIVERSE INSTANCE GENERATION IN ARTIFICIAL INTELLIGENCE PLANNING

(71) Applicant: INTERNATIONAL BUSINESS MACHINES CORPORATION, Armonk, NY (US)

(72) Inventors: Michael Katz, Elmsford, NY (US); Shirin Sohrabi Araghi, Briarcliff manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 544 days.

(21) Appl. No.: 16/679,434

(22) Filed: Nov. 11, 2019

(65) Prior Publication Data

US 2021/0142197 A1 May 13, 2021

(51) Int. Cl.
| | |
|---|---|
| *G06N 7/00* | (2006.01) |
| *G06N 5/02* | (2006.01) |
| *G06N 3/04* | (2006.01) |
| *G06N 20/00* | (2019.01) |
| *G06F 16/901* | (2019.01) |

(52) U.S. Cl.
CPC ......... *G06N 7/005* (2013.01); *G06F 16/9024* (2019.01); *G06F 16/9027* (2019.01); *G06N 5/022* (2013.01); *G06N 3/0427* (2013.01); *G06N 20/00* (2019.01)

(58) Field of Classification Search
CPC ...... G06N 7/005; G06N 5/022; G06N 3/0427; G06N 20/00; G06F 16/9024; G06F 16/9027

See application file for complete search history.

(56) References Cited

U.S. PATENT DOCUMENTS

| | | |
|---|---|---|
| 9,201,692 B2 | 12/2015 | Maiti et al. |
| 10,175,951 B2 | 1/2019 | Stanfill et al. |
| 10,324,690 B2 | 6/2019 | Quali |
| 10,671,076 B1* | 6/2020 | Kobilarov ............. G08G 1/166 |
| 2011/0238614 A1* | 9/2011 | Yoon ..................... G06N 20/00 706/52 |
| 2019/0101919 A1* | 4/2019 | Kobilarov ............ G05D 1/0274 |

FOREIGN PATENT DOCUMENTS

WO      2017139613 A1     8/2017

OTHER PUBLICATIONS

"A review of domain knowledge representation for robot task planning". Sun, X., & Zhang, Y. (Apr. 2019). Proceedings of the 2019 4th International Conference on Mathematics and Artificial Intelligence—ICMAI 2019. doi:10.1145/3325730.3325756. (8 Pages).

(Continued)

*Primary Examiner* — Jonathan Han
(74) *Attorney, Agent, or Firm* — Griffiths & Seaton PLLC

(57) ABSTRACT

Embodiments for creating planning tasks are provided. A plurality of atoms are generated. The plurality of atoms are partitioned into a plurality of variables. A casual graph is generated based on the plurality of variables. A layered graph including interchanging variable value layers and action layers is created based on the casual graph. A planning task is generated based on the layered graph.

15 Claims, 6 Drawing Sheets

(56) References Cited

OTHER PUBLICATIONS

"Random generation of directed acyclic graphs for planning and allocation tasks in heterogeneous distributed computing systems". Velarde Martinez, A. (Nov. 2018). Intelligent Computing: Proceedings of the 2018 Computing Conference, 793-802. doi: 10.1007/978-3-030-01174-1_61. (10 Pages).

"Structural patterns beyond forks: Extending the complexity boundaries of classical planning" Katz and Keyder 2012 (7 Pages).

"New Islands of Tractability of Cost-Optimal Planning" Katz and Domshlak, Journal of Artificial Intelligence Research 32 (2008) 203-288, Submitted Nov. 2007; published May 2008 (86 Pages).

"Structural Patterns of Tractable Sequentially-Optimal Planning" Katz and Domshlak, 2007, Association for the Advancement of Artificial Intelligence (www.aaai.org). (8 Pages ).

"The Fast Downward planning system" Malte Helmert, Journal of Artificial Intelligence Research 26 (2006) 191-246 ( 56 Pages ).

"Solving planning domains with polytree causal graphs is NP-complete" Omer Gimenez arXiv:cs/06010095v1 Oct. 16, 2006 ( 3 Pages ).

"Multi-agent off-line coordination: Structure and complexity" Domahlak and Dinitz, Dept of Computer Science ( 12 Pages ).

"Structure and complexity of planning with unary operators" Carmel Domshlak and Ronen I. Brafman, Journal of Artificial Intelligence Research 2003 ( 5 Pages ).

"Complexity results for SAS+ planning" Backstrom and Nebel, Computational Intel ligence? vol. 11 No. 4 1995 ( 34 Pages ).

"Planning in polynomial time:the SAS-PUBS class" Backstrom and Klein, Computational Intelligence, 7(3):181-197, Aug. 1991 ( 49 Pages ).

"Finding Diverse High-Quality Plans for Hypothesis Generation" Shirin Sohrabi et al., Watson Research Center ( 9 Pages ).

* cited by examiner

| Collection | LM-cut | Symba |
|---|---|---|
| bipartite | 128 | 48 |
| bidirectional bipartite | 28 | 11 |
| chain 0.1 | 277 | 270 |
| chain 0.5 | 285 | 267 |
| chain 0.25 | 270 | 272 |
| chain 0.75 | 206 | 228 |
| complete | 12 | 5 |
| dag 0.1 | 129 | 63 |
| dag 0.5 | 86 | 23 |
| dag 0.25 | 53 | 1 |
| dag 0.75 | 67 | 9 |
| directed chain | 278 | 280 |
| fork | 308 | 275 |
| inverted fork | 284 | 327 |
| polytree 0.1 | 254 | 206 |
| polytree 0.5 | 285 | 244 |
| polytree 0.25 | 298 | 233 |
| polytree 0.75 | 284 | 231 |
| random 0.1 | 77 | 15 |
| random 0.5 | 32 | 1 |
| random 0.25 | 56 | 19 |
| random 0.75 | 7 | 0 |
| star 0.1 | 164 | 103 |
| star 0.5 | 189 | 104 |
| star 0.25 | 177 | 103 |
| star 0.75 | 154 | 111 |
| tree | 304 | 233 |
| Sum | 4692 | 3682 |

FIG. 4

METHODS AND SYSTEMS FOR DIVERSE INSTANCE GENERATION IN ARTIFICIAL INTELLIGENCE PLANNING

BACKGROUND OF THE INVENTION

Field of the Invention

The present invention relates in general to computing systems, and more particularly, to various embodiments for diverse instance generation in artificial intelligence planning.

Description of the Related Art

Automated planning is a field of artificial intelligence (AI) that deals with solving problems that involve finding a strategy of action, provided the problems are modeled in a suitable input language. Automated planning may be utilized to realize, for example, strategies or action sequences for execution by intelligent agents, autonomous robots and unmanned vehicles, etc. In theory, optimal planning includes finding the single best solution to a problem. A wide variety of optimal planners exist, which are able to solve relatively large problems. However, no one tool has been determined to work well for all planning problems, and selecting a planner that works well on a given problem may be difficult and/or time-consuming.

Current approaches utilize machine learning tools to derive portfolio-based meta-planners, which choose a planner with the best predicted performance on a give task from a predefined collection of planners. However, the collection of existing tasks is rather limited, as it is restricted to generated instances of manually created domains, which do not ideally represent the possible variety of planning tasks.

SUMMARY OF THE INVENTION

Various embodiments for creating planning tasks are provided. A plurality of atoms are generated. The plurality of atoms are partitioned into a plurality of variables. A casual graph is generated based on the plurality of variables. A layered graph including interchanging variable value layers and action layers is created based on the casual graph. A planning task is generated based on the layered graph.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a table showing the domain coverage provided by two planners when evaluating a benchmark set;

DETAILED DESCRIPTION OF THE DRAWINGS

Figure 1:
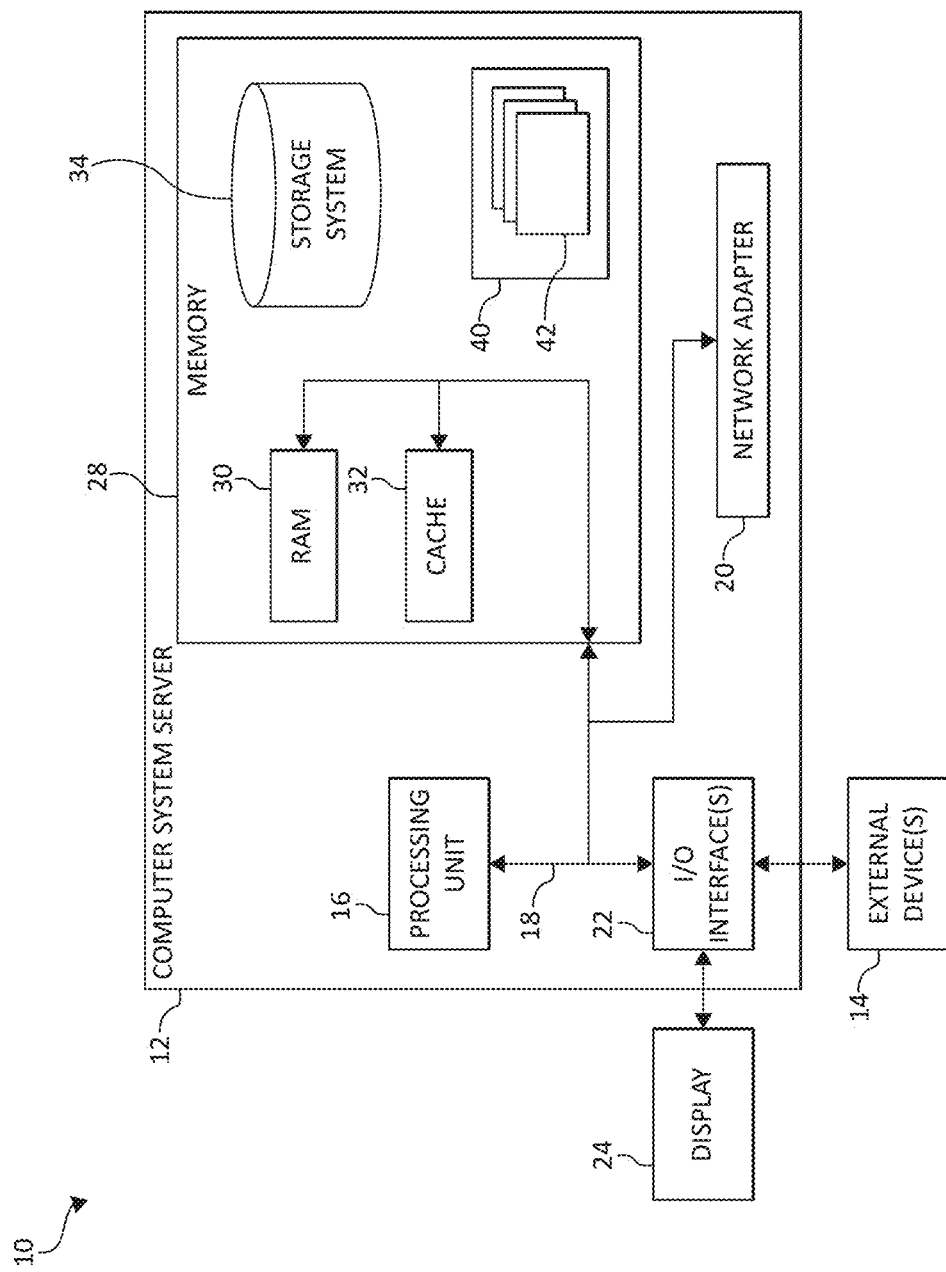
FIG. 1 is a block diagram depicting an exemplary computing node according to an embodiment of the present invention.

As discussed above, automated planning is a field of artificial intelligence (AI) that deals with solving problems that involve finding a strategy of action, provided the problems are modeled in a suitable input language. Automated planning may be utilized to realize, for example, strategies or action sequences for execution by intelligent agents, autonomous robots and unmanned vehicles, etc. In theory, optimal planning includes finding the single best solution to a problem. A wide variety of optimal planners exist, which are able to solve relatively large problems. However, no one tool has been determined to work well for all planning problems, and selecting a planner that works well on a given problem may be difficult and/or time-consuming.

Current approaches utilize machine learning tools to derive portfolio-based meta-planners, which choose a planner with the best predicted performance on a give task from a predefined collection of planners. For example, current approaches may include receiving a collection of planners, along with a collection of existing planning tasks. The planners are run (or executed) on the tasks to determine their performance on the tasks (e.g., to obtain training data). Using this data, a neural network may be trained to predict the performance of the planners on a particular planning problem. The network may then be used to select a planner to solve the given task.

However, the collection of existing tasks is rather limited, as it is restricted to generated instances of manually created domains, which do not ideally represent the possible variety of planning tasks.

Since the first encoding of planning tasks encoded in Stanford Research Institute Problem Solver (STRIPS), data (or planning tasks) was the cornerstone and one of the main drivers of research in planning. With the beginning of planning competitions, came the increase in the availability of planning tasks, with the current estimate of slightly over 70 domains, including some variants in different formalisms. All these domains are hand-crafted, although some correspond to machine translation from a different problem. Not only are most of these domains are hand-crafted, but the collections are not necessarily diverse. Many of these domains are some variants of the transportation problem. A major focus in classical planning was on heuristic searches, with heuristics automatically obtained for planning tasks, exploiting the task structure. Further, the research on the complexity of planning tasks had a major focus on the characterization of planning fragments by their causal graph structure.

As such, the need for data in planning has long been established, by, for example, machine learning based approaches. The existing data, however, is quite limited. There exists only a relatively small amount of hand-crafted planning domains, mostly introduced through planning competitions. Further, this collection of domains is not diverse, as many of the domains are some variants of the transportation problem.

To address these needs and/or the shortcomings in the prior art, in some embodiments described herein, methods and/or systems are disclosed that, for example, alleviate the shortage in existing planning tasks by automatically generating tasks of a particular causal structure. Focusing on particular types of graphs, a graph (G) of such type is randomly generated, and a simplified action structures (SAS+) planning task with the causal graph isomorphic to G is generated.

Therefore, at least some embodiments described herein focus on generating planning tasks with a specific causal graph structure. Given a collection of multi-valued variables and a graph representing causal connections between these variables, a way of generating simplified SAS+ actions, an initial state, and a goal, in a way that the causal graph of the resulting task matches the input graph is provided. Using such an approach, the embodiments described herein are able to generate a diverse collection of planning tasks, as large as needed for the purpose of learning a good planner selection strategy.

In some embodiments described herein, training data that covers the structural variety of possible planning tasks in an improved manner is generated. The generated data has instances of diverse causal dependency structure. As such, it tackles various difficulties of planning tasks and is more representative of the collection of possible planning tasks.

A common input language for planning tasks is Planning Domain Definition Language (PDDL), which may be either "lifted" (i.e., parameterized by objects) or "grounded," as is commonly understood in the art. In some embodiments described herein, the focus is grounded PDDL, restricted to STRIPS formalism. However, because causal dependencies are not visible on STRIPS level, in order to account for them and enforce a specific structure, a grounded SAS+/finite-domain representations (FDR) task is generated and then transformed to STRIP S/(grounded) PDDL.

In some embodiments, a SAS+ task is generated, while keeping the mapping of the task to STRIPS formalism. As one example of such a process, the number of atoms (or conditions) is randomly chosen and generated accordingly. The number of variables is randomly chosen, and the atoms are partitioned into the variables. Given the variables, a graph (or casual graph or CG) over the variables as nodes of a particular structure is generated. Examples of such structures include, but are not limited to, chains, bipartite graphs, forks and inverted forks, trees, polytrees, direct acyclic graphs (DAGs), single-connected DAGs, etc.

In some embodiments, a layered graph is then created, which may be referred to as a (relaxed) planning graph (RPG), which as is commonly understood, includes interchanging layers of values (e.g., variable values) and actions. The first layer of values includes one value per variable (i.e., initial state). Actions for the action layer are then generated, while ensuring that the casual graph of the created problem agrees with the generated layered graph. The number of actions in the action layer or the number of newly generated atoms is restricted. The number of actions or newly generated atoms is randomly chosen. The next layer of values is created by adding all add effects of the actions in the action layer to the previous layer of values.

Each action is created by randomly choosing pre-out of the values layer (e.g., a subset of values from the variable values layer, with at most one value per variable, to serve as an action precondition), dividing it into prevail and del, and choosing an add value for each variable in del. If an action generates edges not in the graph, it is discarded. The creation (or generation) of the layered graph is stopped (or ceased) when the last (or most recently created) layer of values includes all of the atoms and the casual graph is fully covered. A goal is chosen by selecting a value from the new values in the last layer and randomly selecting a subset of variables and one value for each.

The task is then mapped into STRIPS, with the variable values being atoms. For each action, if it pre-specifies a value for the effect variable, the corresponding atom is added to del, otherwise to prevail. All atoms that correspond to effect values are added to the add effects.

As will be appreciated by one skilled in the art, STRIPS planning tasks may be represented by (in one exemplary notation) the tuple P, A, I, G, where P is the set of atoms, I P is the initial state, G P is the goal, and A is the set of actions, each represented by a=pre, add, del, with pre, add, del P standing for preconditions, add, and delete effects.

SAS+/FDR planning tasks may be represented by (in one exemplary notation) the tuple $\mathcal{U}$, A, I, G, where $\mathcal{U}$ is the set of finite-domain variables, each associated with the set of possible values dom($\upsilon$). States are assigned of domain values to all variables, with partial states assigning domain values to a subset of all variables. The state I (full assignment) is the initial state, partial assignment G is the goal, and A is the set of actions, each represented by a=pre, eff, with both pre and eff being partial assignments.

SAS+ tasks have associated structures referred to as casual graphs (CGs). These have variables as their nodes and an edge from u to v if there is an action that changes the value of v conditioned on some value of u.

In some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, creating planning tasks, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a machine learning algorithm/model, chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

In particular, in some embodiments, a method for creating (e.g., automatically creating) a planning task(s), by a processor, is provided. A plurality of atoms are generated. The plurality of atoms are partitioned into a plurality of variables. A casual graph is generated based on the plurality of variables. A layered graph including interchanging variable value layers and action layers is created based on the casual graph. A planning task is generated based on the layered graph.

The generating of the plurality of atoms may include randomly selecting a number of the plurality of atoms. The partitioning the plurality of atoms into the plurality of variables may include randomly selecting a number of the plurality of variables.

The generated planning task may be a simplified action structures (SAS+) planning task. The SAS+ planning task may be translated to a Stanford Research Institute Problem Solver (STRIPS) fragment of Planning Domain Definition Language (PDDL).

The casual graph may include a structure, and the structure may include a chain, a bipartite graph, a fork, a tree, or a direct acyclic graph (DAG). The layered graph may be a relaxed planning graph (RPG).

The creating of the layered graph may be ceased when the last of the variable value layers includes all of the plurality of atoms and the casual graph is fully covered. A goal for the planning task may be created. The creating of the goal may include selecting a value from the last of the variable value layers and randomly selecting at least some of the plurality of variables.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
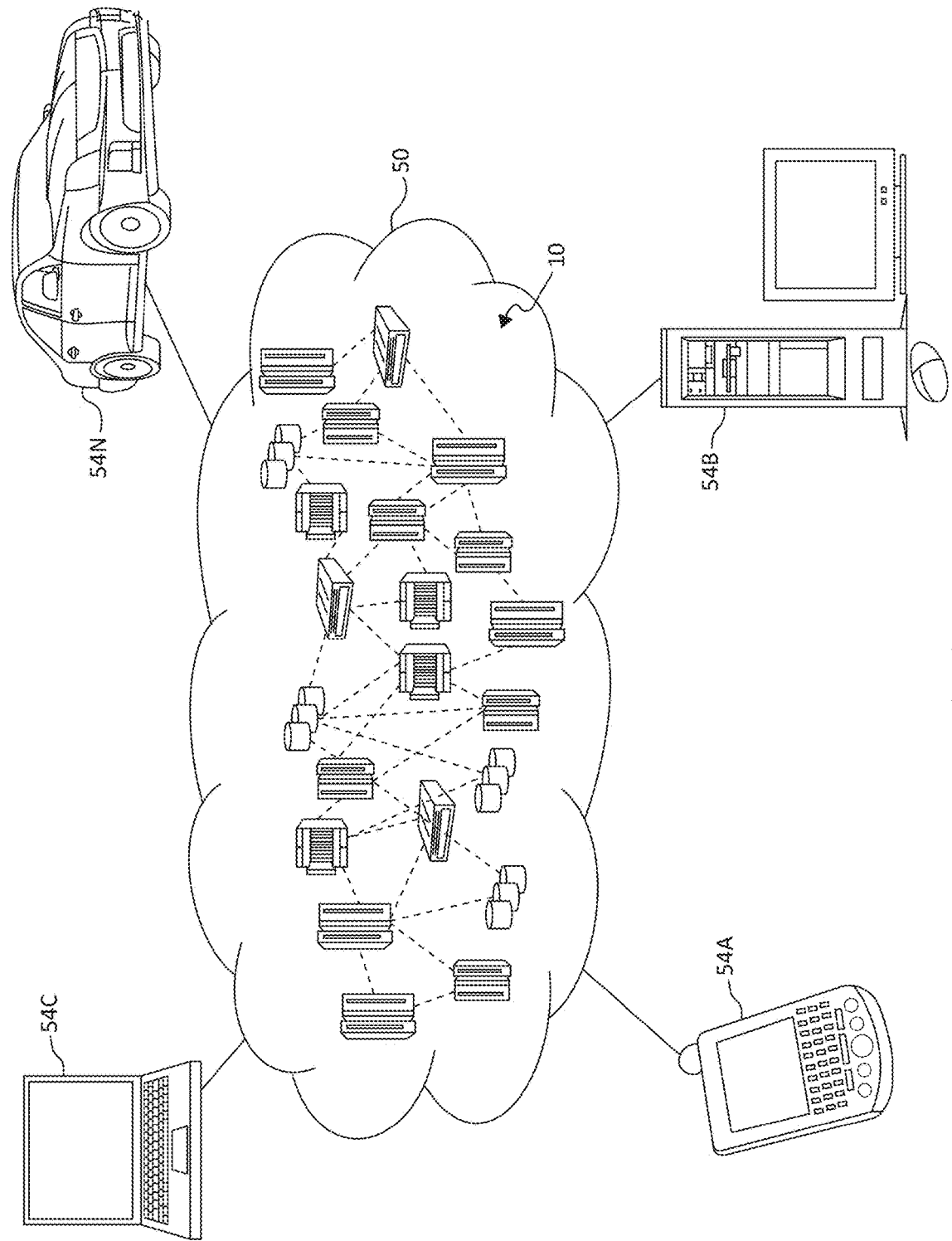
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
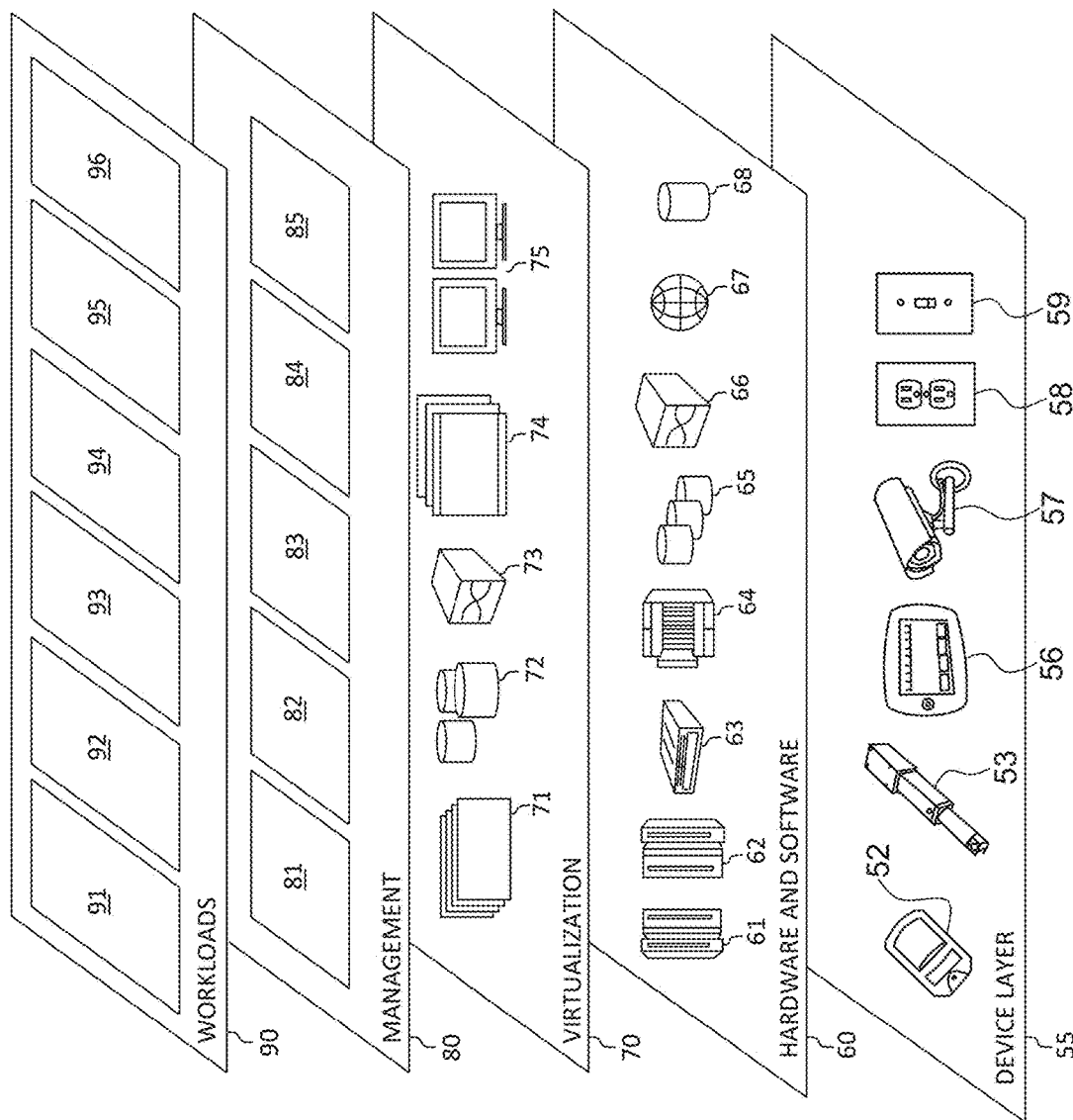
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for creating planning tasks, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example, automatically generate tasks of a particular causal structure. Focusing on particular types of graphs, a graph (G) of such type is randomly created, and a SAS+ planning task with the causal graph isomorphic to the graph is created.

In some embodiments, the number of atoms in a task is randomly selected, and the atoms are generated accordingly. The number of variables in the task is randomly selected, and the atoms are then partitioned into the variables. A graph (or casual graph) over the variables is generated based on the variables. The number of preconditions and effects in an action is randomly selected. A layered graph of actions and atoms is created in such a way to ensure that the graph over the variables agrees with the generated graph. A planning task is then generated.

The graph over the variables may take one of the structures described herein (e.g., chains, bipartite graphs, etc.). The creation of the layered graph may be stopped (or ceased) when the last layer of values includes all atoms, and the causal graph is fully covered. Each action may be created by randomly choosing pre out of the values layer, dividing it into prevail and del, and choosing an add value for each variable in del. If any action generates edges not in the graph, it may be discarded. The goal may be created by selecting a value from the new values in the last layer and then randomly selecting a subset of variables and one value for each.

More specifically, in some embodiments, a SAS+ task is generated, while keeping the mapping of the task to STRIPS formalism. For example, the number of atoms (or conditions) may be randomly chosen and generated accordingly. The number of variables may be randomly chosen, and the atoms partitioned into the variables. Given the variables, a graph over the variables as nodes of a particular structure may be generated. Examples of such structures include, but are not limited to, chains, bipartite graphs, forks and inverted forks, trees, polytrees, DAGs, single-connected DAGs, etc.

In some embodiments, a layered graph (or RPG) may then be created, which includes interchanging layers of values (e.g., variable values) and actions. The first layer of values may include one value per variable (i.e., initial state). Actions for the action layer may then generated, while ensuring that the casual graph of the created problem agrees with the generated graph. The number of actions in the action layer or the number of newly generated atoms may be restricted. The number of actions or newly generated atoms may be randomly chosen. The next layer of values may be created by adding all add effects of the actions in the action layer to the previous layer of values.

Each action may be created by randomly choosing precondition of the values layer, dividing it into prevail and del, and choosing an add value for each variable in del. If an action generates edges not in the graph, it may be discarded. The creation (or generation) of the layered graph may be stopped (or ceased) when the last (or most recently created) layer of values includes all of the atoms and the casual graph is fully covered. A goal may be chosen by selecting a value from the new values in the last layer and randomly selecting a subset of variables and one value for each.

The task may then be mapped into STRIPS, with the variable values being atoms. For each action, if it prespecifies a value for the effect variable, the corresponding atom may be added to del, otherwise to prevail. All atoms that correspond to effect values are added to add.

Other aspects and features of the embodiments described herein are presented below. Additionally, an experimental evaluation is discussed, illustrating the performance of the methods and systems described herein compared to that of two conventional planners.

An SAS+ planning task may be expressed (in another exemplary notation) as a tuple $\mathcal{U}, A, s_0, s^*$, where $\mathcal{U}$ is a set of state variables, and A is a finite set of actions. Each state variable $\upsilon$ $\mathcal{U}$ has a finite domain dom($\upsilon$). Each pair $\upsilon$, of variable $\upsilon$ $\mathcal{U}$ and its value=dom($\upsilon$) is called a "fact." A set of all facts is denoted by F. A (partial) assignment to the variables $\mathcal{U}$ is called a (partial) state. Often it is convenient to view partial state p as a set of facts with $\upsilon$, p if and only if p[$\upsilon$]=. For a partial assignment p, $\mathcal{U}$ (p) $\mathcal{U}$ denotes the subset of state variables instantiated by p. Partial state p is "consistent" with state s if p s. The set of state of a planning task may be denoted by S. $s_0$ is the initial state, and the partial state s* is the goal. Each "action" a is a pair pre(a), eff(a) of partial states called "preconditions" and "effects." An "action cost" is a mapping C: A $\mathbb{R}^{0+}$. An action a is applicable in a state s S if and only if pre(a) is consistent with s. Applying a changes the value of $\upsilon$ to eff(a)[$\upsilon$], if defined. The resulting state is denoted by s ⟦a⟧. An action sequence $\pi = a_1, \ldots, a_k$ is applicable in s if there exist states $s_0, \ldots, s_k$ such that (1) $s_0=s$, and (2) for each $1 \le i \le k$, $a_i$ is applicable in $s_{i-1}$ and $s_i = s_{i-1}$ ⟦a⟧. The $s_k$ may be denoted with s ⟦$\pi$⟧. $\pi$ is a plan if and only if $\pi$ is applicable in $s_0$ and s* is consistent with $s_0$ ⟦$\pi$⟦. $\mathcal{P}(\Pi)$ (or simply $\mathcal{P}$ when the task is clear from the context) may be denoted as the set of all plans $\Pi$. The cost of a plan $\pi$ denoted C($\pi$) is the summed cost of the actions in the plan.

Casual graphs (CGs), a standard structure in classical planning, may take a central role in the embodiments described herein. The casual graph $CG_\Pi$ of a task $\Pi$ is a digraph with vertices $\mathcal{U}$. An arc ($\upsilon$, $\upsilon'$) is in $CG_\Pi$ if and only if $\upsilon \ne \upsilon'$ and there exists an action a A such that ($\upsilon$, $\upsilon'$) [ $\mathcal{U}$(eff(a)) $\mathcal{U}$(pre(a))] $\mathcal{U}$(eff(a)).

Another structure typically used in planning for computing relaxation based heuristics is a relaxed planning graph (RPG), which is a layered graph of facts and actions, describing action application in the planning task, under value accumulating semantics. The layers are added until a fixpoint is reached, that is no new fact can be achieved. The first fact layer $F_1$ thus corresponds to the facts from the initial state, and the last layer is also a fact layer, which is equal to the preceding fact layer. Each action layer $A_i$ consists of all actions from A that are applicable in $F_i$. That is, $A_i$ {a A|pre(a) $F_i$}. The next fact layer $F_{i+1}$ is then constructed by adding to $F_i$ all facts achieved by the actions in $A_i$, namely $F_{i+1} =_{a \; Ai}$ eff(a).

In some embodiments, various types of graphs may be utilized to serve as the casual graph of the constructed (or generated) task. Examples include, but are not limited to, chains, directed chains, forks, inverted forks, bipartite graphs, directed bipartite graphs, trees, polytrees, directed acyclic graphs (DAGs), complete graphs, and random graphs. For some of these structures, such as directed chains, forks, inverted forks, and complete graphs, the graphs are fully defined by the number of nodes. In other cases, randomness may be introduced into the graph construction. Below is a description how such cases may be handled and how a task with the given causal structure may be constructed.

With respect to directed bipartite graphs, a full directed bipartite graph is constructed by first randomly partitioning the nodes into left and right nodes and then introducing an edge from each node on the left to each node on the right. With respect to (undirected) bipartite graphs, a full undirected bipartite graph is constructed by first randomly partitioning the nodes into left and right nodes and then introducing an edge from each node on the left to each node on the right, and vice versa.

With respect to chains, the chain of n nodes $\upsilon_1, \ldots, \upsilon_n$ is created as follows. For each $1 \le i < n$, it is randomly decided whether there is an edge ($\upsilon_i$, $\upsilon_i+1$), with probability p. If not, the edge ($\upsilon_i+1$, $\upsilon_i$) is enforced. If so, whether there is an edge ($\upsilon_i+1$, $\upsilon_i$) with probability p is decided. With respect to trees, a directed tree of n nodes $\upsilon_1, \ldots, \upsilon_n$ is constructed by choosing for each node $\upsilon_i$ a parent randomly out of the nodes $\upsilon_1, \ldots, \upsilon_{i-1}$. For polytrees, a method similar to that of trees is utilized, but the direction of each edge is switched with probability p.

With respect to DAGs, a DAG of n nodes $\upsilon_1, \ldots, \upsilon_n$ is constructed by choosing for each node $\upsilon_i$ at least one parent randomly out of the nodes $\upsilon_1, \ldots, \upsilon_{i-1}$. This may be performed by going over all the preceding nodes and deciding with probability p whether to add an edge from the preceding node to the current node. If no edges were added, this is repeated until at least one edge is added for each node (except the first one). For random graphs, for each pair of nodes $v_i$ and $v_j$ it is randomly decided whether to add a directed edge from $v_i$ to $v_j$.

In some embodiments, the planning task construction may be performed as follows. Given a graph $G=(\mathcal{U}, E)$, the planning task $\Pi=\mathcal{U}, A, s_0, s^*$ with the causal graph G is constructed as follows. First, the domain size $d(v){\geq}2$ is chosen for each variable $v$ $\mathcal{U}$, and it is assumed without loss of generality that the values are $dom(v)=\{0, \ldots, d(v)-1\}$. As the variables represent sets of mutually exclusive facts, and each such set corresponds to one of the two types of mutexes, namely, either exactly one or at most one of the values is true in all reachable states, which variables belong to which category is randomly decided. For the variables that represent the at-most-one case, the last domain value is dedicated to represent the case when none of the other facts are true. Next, without loss of generality, it is assumed that $s_0[v]=0$ for all $v$ $\mathcal{U}$. Then, the actions are constructed in layers while constructing the related planning graph. Finally, the goal is chosen from the last fact layer of the relaxed planning graph, ensuring that at least one of the chosen facts is unique to the last fact layer. The manner in which actions are constructed is described below.

Starting with the initial state as the first fact layer $F_1$, an action layer $L_i$ is created by (1) selecting a subset of facts from the fact layer $F_i$, ensuring at most one fact per variable, (2) partitioning the selected set of facts into prevail condition and precondition, and (3) choosing, for all the variables of the precondition facts, a different value as its effect. It should be noted that while SAS+ representation may not require the precondition to be specified when the effect is specified, in order to ensure maintaining variables as mutexes of facts, embodiments described herein may be restricted to always specifying the precondition in such cases.

In some embodiments, the constructed action is checked against the graph G, ensuring that it contributes only edges that exist in G. If not, the action is discarded. Additionally, if the constructed action does not add any new causal edges and does not achieve new facts, it is randomly decided whether or not to keep it. Each layer is constructed until a sufficient number of new facts (action effects) are created. In order to ensure that new facts are indeed created, the action effects are enforced to include a new fact. This may be done in several ways. For example, (a) an action may achieve a new fact without adding any edges to the causal graph. In such instances, an unachieved fact may be randomly chosen for the effect and some achieved fact of the same variable for the precondition. As another example, (b) an action may attempt to ensure that in steps (1) and (2) above at least one fact is chosen to the precondition from variables with at least one fact outside of $F_i$, and in (3) choosing such fact into the effect. If the causal edges contributed by the action do not comply with G, the action is discarded.

For each of the two cases above, it is randomly decided whether to obtain an action as in (a), as in (b), or without enforcing these restrictions. If both (a) and (b) occur, precedence is given to (a), since it would necessarily result in an action that adds a new fact. The construction may be stopped when all facts were achieved and all edges from G are reflected in the causal graph of the constructed planning task. The latter is enforced in the last layer. The result of this process is a SAS+ task, as is commonly understood.

In order to create a PDDL task, the SAS+ task is then translated to the STRIPS fragment of PDDL, ignoring the facts that correspond to the last value of the variables representing the at-most-one case. PDDL preconditions are taken from prevails and preconditions, add effects are taken from the effects, and delete effects are taken from the preconditions. It should be noted that if the tasks are translated from STRIPS back to SAS+, there may be nothing that enforces that the same mutex groups will be detected. Thus, the causal graph structure is not necessarily preserved by translating to STRIPS and back to SAS+.

As an example of an experimental evaluation of the methods and systems described herein, a benchmark set may be generated as follows. For each of the causal graph structures mentioned above, and a value in [0.1, 0.25, 0.5, 0.75] for edge probability (if needed), a domain is created. This results in 27 domains, with 7 causal graph structures that do not consider edge probabilities and 5 causal graph structures that do. For each such domain, we generate 512 instances by uniformly choosing the number of atoms (4 variants), variables (4 variants), goal variables (4 variants), maximum prevail size (2 variants), maximum effect size (2 variants), and the upper bound on the minimum number of atoms per layer (2 variants). Thus, such a constructed benchmark set consists of 13824 generated planning tasks.

When the constructed set is evaluated by running two modern cost-optimal planners (e.g., utilizing 2.67 GHz machines with time and memory limits of 5 minutes and 7.6 GB, respectively) that are sufficiently different from each other: A* with LM-cut heuristic and Symba, as will be appreciated by one skilled in the art. The result is the domain coverage indicated in table 400 shown in FIG. 4.

Figure 5:
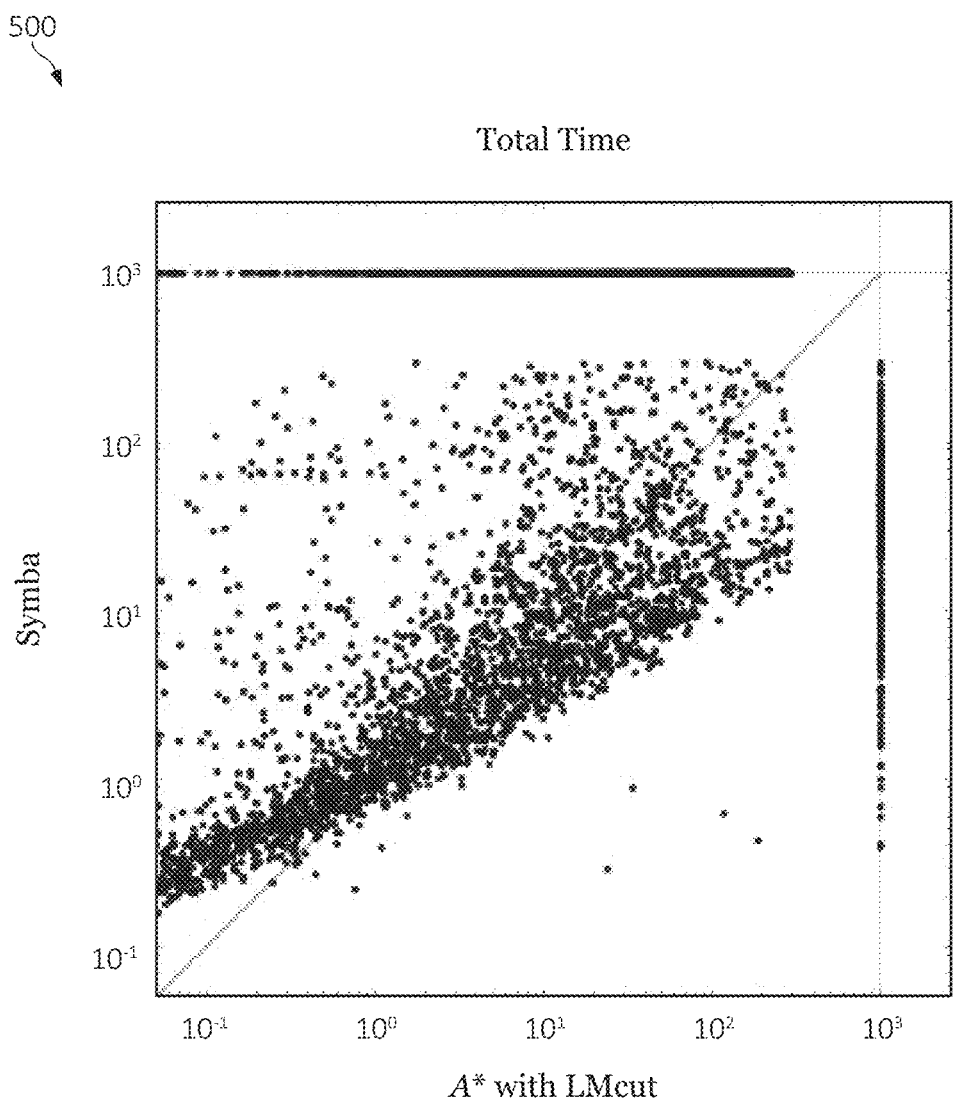
FIG. 5 is a graph showing the total time required on each task for the two planners of FIG. 4.

Referring to FIG. 4, the coverage captures only the solvable tasks, while nothing in the task generation approach described herein forces the resulting task to be solvable. In addition, LM-cut and Symba are able to recognize unsolvable tasks in 137 cases and 507 cases, respectively. Out of these, unsolvability is recognized in the preprocessing step by LM-cut in 24 cases, while by Symba in all 507 cases. Note that for each of the techniques, on each of the domains, there remains a significant number of tasks not solved. Further, there are a significant number of tasks in each domain that were not solved by either of the two techniques. Going beyond aggregated coverage results, FIG. 5 shows the total time required for each planner (i.e., LM-cut and Symba) on each of these tasks. Note that there is no clear advantage to either of the approaches. With respect to timeouts, there are 1380 cases where Symba timeouts but LM-cut does not, and 233 cases where LM-cut timeouts but Symba does not.

As such, in the embodiments described herein, an approach is provided that allows planning tasks to be generated with the causal graph of a specific given structure. Further, the tasks may be cast into a STRIPS fragment of PDDL, allowing their use as an input to any PDDL planner that supports the STRIPS fragment, as most mature planning systems do. Using such, a collection of 27 domains characterized by the causal graph structure was created, with 512 tasks in each domain, for a total of 13824 ground PDDL tasks.

Figure 6:
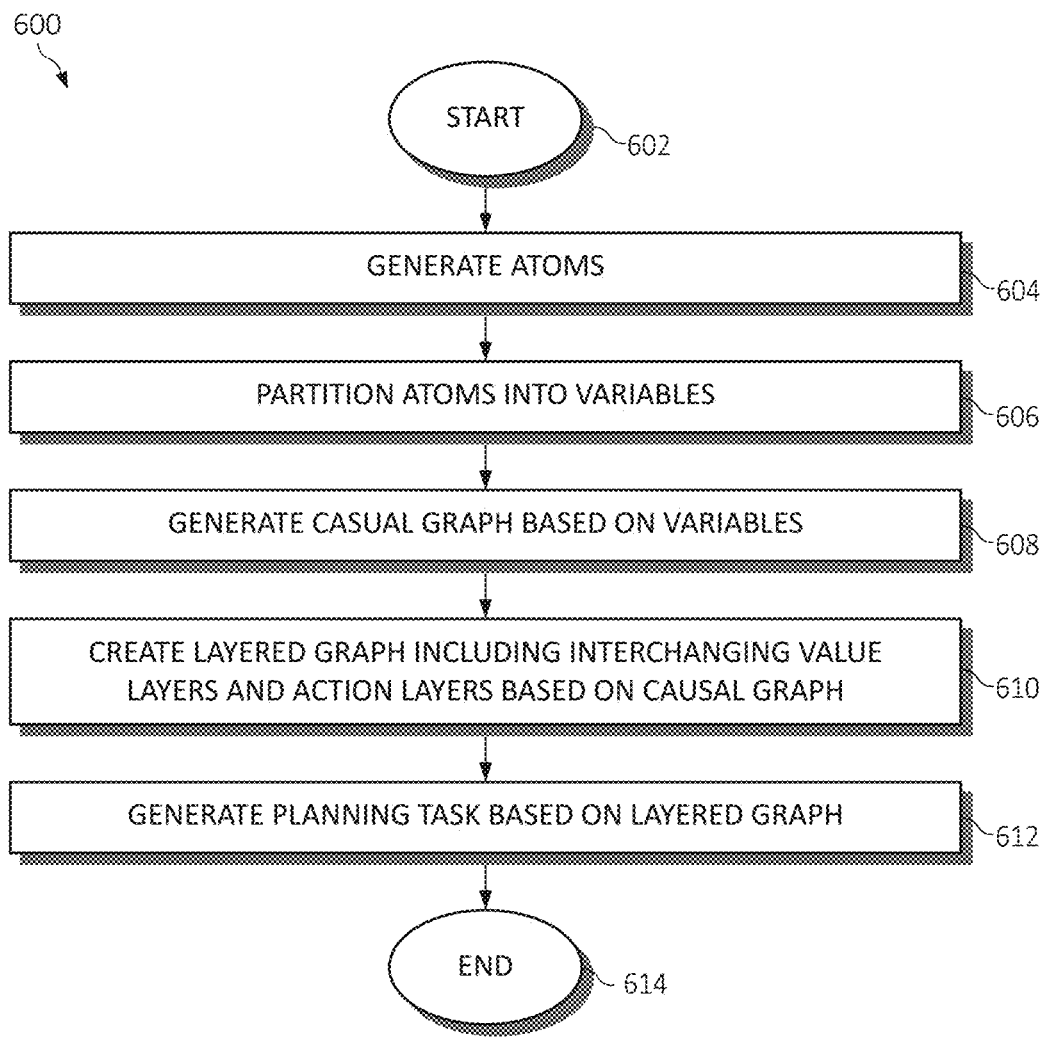
FIG. 6 is a flowchart diagram of an exemplary method for automatically creating a planning task according to an embodiment of the present invention.

Turning to FIG. 6, a flowchart diagram of an exemplary method 600 for automatically creating a planning task(s) is provided. The method 600 begins (step 602) with, for example, a user deciding to generate training data that cover a wide variety of possible planning tasks.

A plurality of atoms are generated (step 604). The generating of the plurality of atoms may include randomly selecting a number of the plurality of atoms.

The plurality of atoms are partitioned into a plurality of variables (step 606). The partitioning the plurality of atoms into the plurality of variables may include randomly selecting a number of the plurality of variables.

A casual graph is generated based on the plurality of variables (step 608). The casual graph may include a structure, and the structure may include, for example, a chain, a bipartite graph, a fork, a tree, or a direct acyclic graph (DAG).

A layered graph including interchanging value (e.g., variable value) layers and action layers is created based on the casual graph (step 610). The layered graph may be a relaxed planning graph (RPG). The creating of the layered graph may be ceased when the last of the value layers includes all of the plurality of atoms and the casual graph is fully covered. A goal for the planning task may be created. The creating of the goal may include selecting a value from the last of the value layers and randomly selecting at least some of the plurality of variables.

A planning task is generated based on the layered graph (step 612). The generated planning task may be a simplified action structures (SAS+) planning task. The SAS+ planning task may be translated to a Stanford Research Institute Problem Solver (STRIPS) fragment of Planning Domain Definition Language (PDDL).

Method 600 ends (step 614) with, for example, the planning task being utilized to, for example, develop strategies or action sequences, such as for execution by intelligent agents, autonomous robots and unmanned vehicles, etc. In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for creating a planning task, by a processor, comprising:
    generating a plurality of atoms;
    partitioning the plurality of atoms into a plurality of variables;
    generating a casual graph based on the plurality of variables;
    creating a layered graph including interchanging variable value layers and action layers based on the casual graph, wherein the creating of the layered graph is ceased when the last of the variable value layers includes all of the plurality of atoms and the casual graph is fully covered; and
    generating a planning task based on the layered graph according to a goal created for the planning task, wherein the creating of the goal includes selecting a value from the last of the variable value layers and randomly selecting at least some of the plurality of variables.

2. The method of claim 1, wherein the generating of the plurality of atoms includes randomly selecting a number of the plurality of atoms, and wherein the partitioning the plurality of atoms into the plurality of variables includes randomly selecting a number of the plurality of variables.

3. The method of claim 1, wherein the generated planning task is a simplified action structures (SAS+) planning task, and further comprising translating the SAS+ planning task to a Stanford Research Institute Problem Solver (STRIPS) fragment of Planning Domain Definition Language (PDDL).

4. The method of claim 1, wherein the casual graph includes a structure, and the structure includes a chain, a bipartite graph, a fork, a tree, or a direct acyclic graph (DAG).

5. The method of claim 1, wherein the layered graph is a relaxed planning graph (RPG).

6. A system for creating a planning task comprising:
    a processor executing instructions stored in a memory device, wherein the processor:
        generates a plurality of atoms;
        partitions the plurality of atoms into a plurality of variables;
        generates a casual graph based on the plurality of variables;
        creates a layered graph including interchanging variable value layers and action layers based on the casual graph, wherein the creating of the layered graph is ceased when the last of the variable value layers includes all of the plurality of atoms and the casual graph is fully covered; and
        generates a planning task based on the layered graph according to a goal created for the planning task, wherein the creating of the goal includes selecting a value from the last of the variable value layers and randomly selecting at least some of the plurality of variables.

7. The system of claim 6, wherein the generating of the plurality of atoms includes randomly selecting a number of the plurality of atoms, and wherein the partitioning the plurality of atoms into the plurality of variables includes randomly selecting a number of the plurality of variables.

8. The system of claim 6, wherein the generated planning task is a simplified action structures (SAS+) planning task, and wherein the processor further translates the SAS+ planning task to a Stanford Research Institute Problem Solver (STRIPS) fragment of Planning Domain Definition Language (PDDL).

9. The system of claim 6, wherein the casual graph includes a structure, and the structure includes a chain, a bipartite graph, a fork, a tree, or a direct acyclic graph (DAG).

10. The system of claim 6, wherein the layered graph is a relaxed planning graph (RPG).

11. A computer program product for creating a planning task, by a processor, the computer program product embodied on a non-transitory computer-readable storage medium having computer-readable program code portions stored therein, the computer-readable program code portions comprising:
    an executable portion that generates a plurality of atoms;
    an executable portion that partitions the plurality of atoms into a plurality of variables;
    an executable portion that generates a casual graph based on the plurality of variables;
    an executable portion that creates a layered graph including interchanging variable value layers and action layers based on the casual graph, wherein the creating of the layered graph is ceased when the last of the variable value layers includes all of the plurality of atoms and the casual graph is fully covered; and
    an executable portion that generates a planning task based on the layered graph according to a goal created for the planning task, wherein the creating of the goal includes selecting a value from the last of the variable value layers and randomly selecting at least some of the plurality of variables.

12. The computer program product of claim 11, wherein the generating of the plurality of atoms includes randomly selecting a number of the plurality of atoms, and wherein the partitioning the plurality of atoms into the plurality of variables includes randomly selecting a number of the plurality of variables.

13. The computer program product of claim 11, wherein the generated planning task is a simplified action structures (SAS+) planning task, and wherein the computer-readable program code portions further include an executable portion that translates the SAS+ planning task to a Stanford Research Institute Problem Solver (STRIPS) fragment of Planning Domain Definition Language (PDDL).

14. The computer program product of claim 11, wherein the casual graph includes a structure, and the structure includes a chain, a bipartite graph, a fork, a tree, or a direct acyclic graph (DAG).

15. The computer program product of claim 11, wherein the layered graph is a relaxed planning graph (RPG).

* * * * *